United States Patent
Conley et al.

(10) Patent No.: US 9,810,372 B2
(45) Date of Patent: Nov. 7, 2017

(54) BEARING SYSTEM WITH LUBRICATED EXCLUSION SEAL

(71) Applicants: Paul George Conley, St. Charles, MO (US); Bryan Uncapher, Grayslake, IL (US); Joe T Inciong, Skokie, IL (US)

(72) Inventors: Paul George Conley, St. Charles, MO (US); Bryan Uncapher, Grayslake, IL (US); Joe T Inciong, Skokie, IL (US)

(73) Assignee: LINCOLN INDUSTRIAL COPORATION, St. Louis, MO (US)

( * ) Notice: Subject to any disclaimer, the term of this patent is extended or adjusted under 35 U.S.C. 154(b) by 351 days.

(21) Appl. No.: 14/587,302

(22) Filed: Dec. 31, 2014

(65) Prior Publication Data

US 2016/0186811 A1   Jun. 30, 2016

(51) Int. Cl.

| | |
|---|---|
| *F16C 33/72* | (2006.01) |
| *F16C 33/80* | (2006.01) |
| *F16N 29/04* | (2006.01) |
| *F16N 29/02* | (2006.01) |
| *F16N 13/00* | (2006.01) |

(Continued)

(52) U.S. Cl.
CPC ............... *F16N 29/04* (2013.01); *F16C 33/76* (2013.01); *F16N 13/00* (2013.01); *F16N 29/02* (2013.01); *F16C 35/047* (2013.01); *F16N 2250/04* (2013.01); *F16N 2270/00* (2013.01)

(58) Field of Classification Search
CPC ............... F16C 33/6625; F16C 33/726; F16C 33/7886; F16N 29/02; F16N 13/00; F16J 15/3232

USPC .......................................................... 184/6.1
See application file for complete search history.

(56) References Cited

U.S. PATENT DOCUMENTS 4,380,416 A * 4/1983 Menager ............... F04D 29/126
                                                        277/361
4,738,336 A * 4/1988 Smith ..................... F16N 29/02
                                                        184/108

(Continued)

FOREIGN PATENT DOCUMENTS

DE        20107630         10/2001
DE        10059797 A1       6/2002

(Continued)

*Primary Examiner* — William E Dondero
*Assistant Examiner* — Mark K Buse
(74) *Attorney, Agent, or Firm* — Mark Ussai; SKF USA Inc. Patent Dept.

(57) ABSTRACT

A bearing system includes a bearing housing configured to house a bearing and enclosing a free volume for receiving a lubricant, a bearing, a pump configured to pump lubricant into the free volume, a shaft in an opening in the housing rotatably supported by the bearing, an exclusion seal between the shaft opening and the shaft that is repeatably and non-destructively shiftable from a sealing state in which it substantially prevents lubricant from leaving the free volume and a release state in which it allows lubricant to escape between the exclusion seal and the shaft. The exclusion seal is caused to shift by increasing and decreasing a pressure in the bearing housing, and the system includes a controller configured to repeatedly shift the exclusion seal by raising and lowering the pressure in the free volume to continuously maintain a lubricating film between the exclusion seal and the shaft.

20 Claims, 6 Drawing Sheets

(51) Int. Cl.
*F16C 33/76* (2006.01)
*F16C 35/04* (2006.01)

(56) References Cited

U.S. PATENT DOCUMENTS

| | | | |
|---|---|---|---|
| 5,060,760 A * | 10/1991 | Long | F16C 19/52 184/6.4 |
| 5,526,783 A | 6/1996 | Ito et al. | |
| 5,671,825 A * | 9/1997 | Wong | F16C 19/52 184/6.4 |
| 5,813,496 A | 9/1998 | Hyvonen et al. | |
| 5,911,289 A | 6/1999 | Waller | |
| 5,921,350 A | 7/1999 | Tsai | |
| 5,952,803 A | 9/1999 | Canada et al. | |
| 5,969,601 A | 10/1999 | Sato et al. | |
| 6,008,724 A | 12/1999 | Thompson | |
| 6,101,427 A | 8/2000 | Yang | |
| 6,125,969 A | 10/2000 | Graf et al. | |
| 6,161,962 A | 12/2000 | French et al. | |
| 6,189,656 B1 | 2/2001 | Morgenstern et al. | |
| 6,196,057 B1 | 3/2001 | Discenzo | |
| 6,216,822 B1 | 4/2001 | May et al. | |
| 6,253,601 B1 | 7/2001 | Wang et al. | |
| 6,286,363 B1 | 9/2001 | Discenzo | |
| 6,324,899 B1 | 12/2001 | Discenzo | |
| 7,017,712 B1 | 3/2006 | Rake et al. | |
| 7,018,106 B2 | 3/2006 | Okada | |
| 7,140,468 B2 | 11/2006 | Rake et al. | |
| 7,665,577 B2 | 2/2010 | Javelly et al. | |
| 8,479,886 B2 | 7/2013 | Tokuyama et al. | |
| 8,668,050 B2 | 3/2014 | Tokuyama et al. | |
| 8,979,385 B2 * | 3/2015 | Haepp | F16C 33/7886 384/480 |
| 9,090,122 B2 * | 7/2015 | Morita | F16C 33/805 |
| 9,146,006 B2 * | 9/2015 | Kreutzkamper | F16N 7/385 |
| 9,222,516 B2 * | 12/2015 | Furukoshi | F16C 33/7853 |
| 9,291,203 B2 * | 3/2016 | Lewis | F16C 41/00 |
| 9,624,978 B2 * | 4/2017 | Ito | F16C 33/6659 |
| 2003/0015374 A1 * | 1/2003 | Matsuura | F16C 19/163 184/7.4 |
| 2003/0110860 A1 | 6/2003 | Okada | |
| 2003/0115977 A1 * | 6/2003 | Holweg | F16C 19/52 73/865.9 |
| 2004/0197040 A1 | 10/2004 | Walker et al. | |
| 2007/0030162 A1 | 2/2007 | Okada et al. | |
| 2012/0221153 A1 | 8/2012 | Emlind et al. | |
| 2013/0015019 A1 * | 1/2013 | Kuvaja | F16N 7/38 184/26 |
| 2013/0241270 A1 * | 9/2013 | Morita | F16C 33/805 301/110 |
| 2013/0277148 A1 | 10/2013 | Beck et al. | |
| 2014/0177991 A1 * | 6/2014 | Toyoda | F16C 33/7813 384/480 |
| 2015/0128415 A1 * | 5/2015 | Russalian | F04D 29/049 29/888.02 |
| 2015/0252944 A1 * | 9/2015 | Kreutzkaemper | F16C 33/6625 184/6.1 |
| 2015/0300411 A1 * | 10/2015 | Tomura | F16C 33/7883 384/478 |
| 2015/0377357 A1 * | 12/2015 | Epshetsky | F16J 15/3232 277/402 |
| 2016/0003357 A1 * | 1/2016 | Kanzaki | F16C 33/7876 277/351 |
| 2016/0047419 A1 * | 2/2016 | Weiss, II | F16C 19/06 384/480 |
| 2016/0061266 A1 * | 3/2016 | Baart | F16C 33/805 384/459 |
| 2016/0229470 A1 * | 8/2016 | Suzuki | F16C 33/7889 |
| 2016/0236509 A1 * | 8/2016 | Gull | B60B 27/0073 |
| 2016/0245340 A1 * | 8/2016 | Kaiser | F16C 33/7863 |
| 2016/0312833 A1 * | 10/2016 | Liang | F16C 33/726 |

FOREIGN PATENT DOCUMENTS

| | | |
|---|---|---|
| EP | 1277977 B1 | 8/2006 |
| EP | 1801415 B1 | 6/2014 |

* cited by examiner

BEARING SYSTEM WITH LUBRICATED EXCLUSION SEAL

TECHNOLOGICAL FIELD

The present disclosure is directed to a bearing system having a lubricated exclusion seal and, more specifically, toward a bearing system having a lubricated exclusion seal and a controller configured to maintain a film of lubricant between the exclusion seal and a shaft or element slidingly engaged by the seal.

BACKGROUND

Automatic lubrication systems are known that include mechanical dosing and pumping components. These components may be configured to provide a fixed dose of lubricant (grease or oil or other suitable lubricant, referred to hereinafter generally as "grease") at predetermined intervals. The intervals and doses are conventionally set by manually adjusting each of the individual dosing devices. A lubrication system that provides a greater degree of control and more automated control over lubricant dosing is disclosed in U.S. Patent Application Publication No. 2013/0015019 A1 for an "Advanced Lubrication System," which disclosure is hereby incorporated by reference.

An example of a mechanical system that requires lubrication is a bearing assembly encased in a bearing housing. These systems include a housing containing the bearing, and the housing has a free volume, that is, a volume potentially fillable with lubricant when lubricant is pumped into the housing through a lubrication inlet. A shaft extends through an opening in the housing, and a seal is provide between the shaft and the housing, either on the shaft or on the housing. Seals may either be fixed to a housing and have a radially inwardly extending lip configured to ride on or engage a rotatable shaft or may be fixed to a shaft and have a radially outwardly extending lip configured to ride on or engage the opening in the housing. The following discussion will generally discuss seals mounted on a housing but applies equally to shaft-mounted seals.

Bearing housings also generally include one or more pressure relief valves (purge valves), which may comprise, for example, spring-biased check valves. When the pressure in the housing reaches a certain level, 5 psi, for example, the relief valve opens and allows lubricant to escape through the relief valve until the pressure drops below the certain level. However, bearing pressure relief valves are notoriously unreliable and prone to frequent failure. When these valves fail, lubricant may leak uncontrollably from the housing and produce an under-lubrication condition for the bearing which could rapidly lead to bearing damage or failure if not quickly addressed.

Conventional lubrication systems are generally configured to provide lubricant based on the needs of the bearing or component being lubricated. When a determination is made that the bearing requires additional lubricant, a pump may be actuated to pump additional lubricant into the bearing housing. The housing is generally completely full of lubricant and pressurized to some extent 2-5 psi, for example. The pressure in the housing while the bearing is operating will generally be lower than the pressure at which the pressure relief valve opens. Adding a sufficient lubricant to the bearing housing can increase the pressure to a level greater than 5 psi and cause lubricant to be expelled through the pressure relief valve. Adding lubricant intermittently or periodically to the bearing housing without raising the pressure above 5 psi helps ensure that adequate lubrication is provided for the bearing at all times.

Bearing housings are used in many different environments. In the mining field and various industrial fields, bearing housings are exposed to dust, dirt and other contaminants which will damage a bearing if they are able to enter the bearing housing. Exclusion seals are particularly useful for providing a seal between a shaft and a bearing in such environments. Exclusion seals are configured to keep dirt and other contaminants out of a bearing housing. When exclusion seals are new, they accomplish this exclusion of dirt by maintaining a tight seal between the shaft and the housing. The interface between the shaft and seal is so tight that dirt and other contaminants impinging on the shaft/seal interface are unable to fit between the shaft and seal. When exclusion seals wear, they provide a less secure seal and are less able to physically block contaminants from entering the bearing housing. However, beneficially, worn exclusion seals allow a small amount of grease to leak from the bearing housing, and this outward leakage of grease helps push contaminants that accumulate or impinge against the shaft/seal interface away from the interior of the bearing housing.

To maximize an exclusion seal's ability to exclude contaminants, it would generally be desirable to maintain as tight a seal as possible between the seal and the shaft. However, the friction produced at the shaft/seal interface and thus the frictional drag on the shaft is related to the pressure with which the seal engages the shaft. High pressure also causes the seal to wear faster that a seal that engages the shaft with a light pressure. Therefore, a balance must be struck between keeping the seal as tight as possible to keep contaminants out of the bearing housing and using a loose seal to minimize the energy usage required to drive a shaft in physical engagement with the seal.

It would be desirable to provide a bearing system that avoids the problems of conventional, unreliable, pressure relief valves and that also ensures a high degree of contaminant exclusion by an exclusion seal, even as the seal wears.

SUMMARY

These and other problems are addressed by the present disclosure, a first aspect of which comprises a bearing system that includes a bearing housing configured to house a bearing, the bearing housing enclosing a free volume for receiving lubricant and including a shaft opening. The system includes a bearing assembly in the bearing housing, a pump configured to pump lubricant into the free volume, a shaft in the shaft opening rotatably supported by the bearing and an exclusion seal between the shaft opening and the shaft. The exclusion seal is configured to be repeatably and non-destructively shiftable from a sealing state in which the exclusion seal substantially prevents lubricant from leaving the free volume and a release state in which the exclusion seal allows lubricant to escape between the exclusion seal and the shaft. The exclusion seal is shiftable from the sealing state to the release state by increasing a pressure in the bearing housing to above a first level and is shiftable from the release state to the sealing state by decreasing the pressure to below the first level. The system also includes a controller configured to repeatedly shift the exclusion seal between the sealing state and the release state by raising and lowering the pressure in the free volume in order to continuously maintain a lubricating film of the lubricant between the exclusion seal and the shaft.

Another aspect of the disclosure comprises a bearing system that includes a bearing housing configured to house a bearing, the bearing housing enclosing a free volume for receiving a lubricant and including a shaft opening, a shaft in the shaft opening, and an exclusion seal between the shaft opening and the shaft. The exclusion seal is repeatably and non-destructively shiftable from a sealing state in which the exclusion seal substantially prevents lubricant from leaving the free volume and a release state in which the exclusion seal allows the lubricant to escape between the exclusion seal and the shaft. The exclusion seal is shiftable from the sealing state to the release state by increasing a pressure in the bearing housing to above a first level and is shiftable from the release state to the sealing state by decreasing the pressure to below the first level. The bearing housing does not include a purge valve, and the only location for the lubricant to exit the bearing housing is between the shaft and the exclusion seal.

Still another aspect of the disclosure comprises a bearing system comprising a bearing housing configured to house a bearing, the bearing housing enclosing a free volume for receiving a lubricant and including a shaft opening, a pump configured to pump the lubricant into the bearing housing, a shaft in the shaft opening, and at least one exclusion seal between the shaft opening and the shaft. The exclusion seal is configured to allow the lubricant to escape past the exclusion seal when the pressure is above a first level. The system also includes a controller operably connected to the pump for controlling the pump and a pressure sensor configured to measure a pressure in the bearing housing and to send an output signal to the controller indicative of the measured pressure. The controller is configured to add the lubricant to the housing and monitor a pressure in the housing while adding the lubricant, to determining a maximum pressure obtainable by adding the lubricant to the housing, and if the maximum pressure is not greater than a predetermined pressure, to provide a signal indicative of a worn seal.

BRIEF DESCRIPTION OF THE DRAWINGS

These and other aspects and features of the present disclosure will be better understood after a reading of the following detailed description together with the attached drawings, wherein.

DETAILED DESCRIPTION

Figure 1:
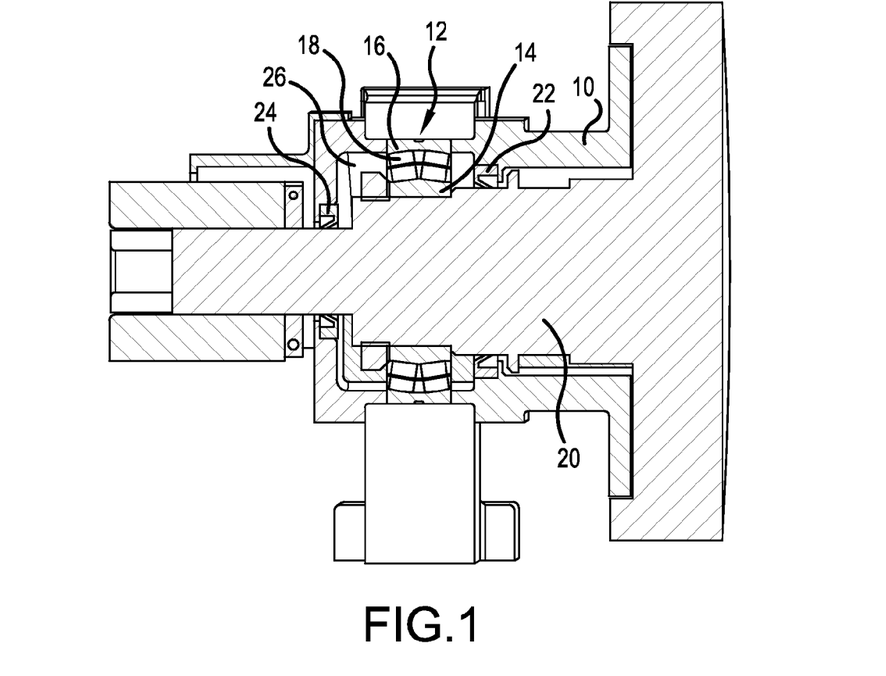
FIG. 1 is a schematic sectional side elevational view of a bearing housing including a bearing that can be lubricated with an embodiment of the present disclosure.

Referring now to the drawings, wherein the showings are for the purpose of illustrating presently preferred embodiments of the disclosure only and not for the purpose of limiting same, FIG. 1 illustrates a housing 10 containing a bearing assembly 12 that includes an inner ring 14, an outer ring 16 and a plurality of rolling elements 18 between the inner ring 14 and the outer ring 16. The bearing assembly 12 supports a shaft 20 for rotation relative to the housing 10, and an inner seal 22 and an outer seal 24 seal a free volume 26 inside the housing, which free volume 26 is completely or substantially filled with a lubricant, such as grease. The free volume 26 includes the spaces inside the bearing assembly 12 where the grease makes contact with the rolling elements 18, the region immediately adjacent to the shaft 20 where the grease is churned when the shaft 20 rotates, and the regions axially away from the bearing assembly 12 and radially away from the shaft 20 where the grease does not actively perform a lubricating function but where it is available to move into contact with the bearing assembly 12 or the shaft 20 as the shaft 20 and roller elements 18 move in the housing 10 and mix the lubricant.

The inner seal 22 and the outer seal 24 are preferably exclusion seals, that is, seals specifically configured to keep debris and contaminants out of the free volume 26 and away from the bearing assembly 12. Such seals are configured to allow grease to escape from inside a bearing housing when the pressure in the bearing housing exceeds a predetermined level. Such a pressure increase may be caused, for example, by adding additional grease through the lubrication inlet 28 (illustrated in FIGS. 2-4). However, conventional bearing housings include pressure relief valves (purge valves) that allow grease to escape from the free volume 26 before the pressure reaches the predetermined level. In conventional housings sealed with exclusion seals, therefore, the exclusion seals generally do not allow grease to escape unless they are very worn and near the end of their service life, in which case they may allow some leakage of grease. In the present disclosure, on the other hand, the bearing housing 10 does not include a pressure relief valve, and the exclusion seals provide the only exit path for grease to leave the bearing housing 10. The amount of grease and the rate at which grease can be forced out of the bearing housing 10 is controllable by controlling the pressure in the bearing housing 10.

Figure 2:
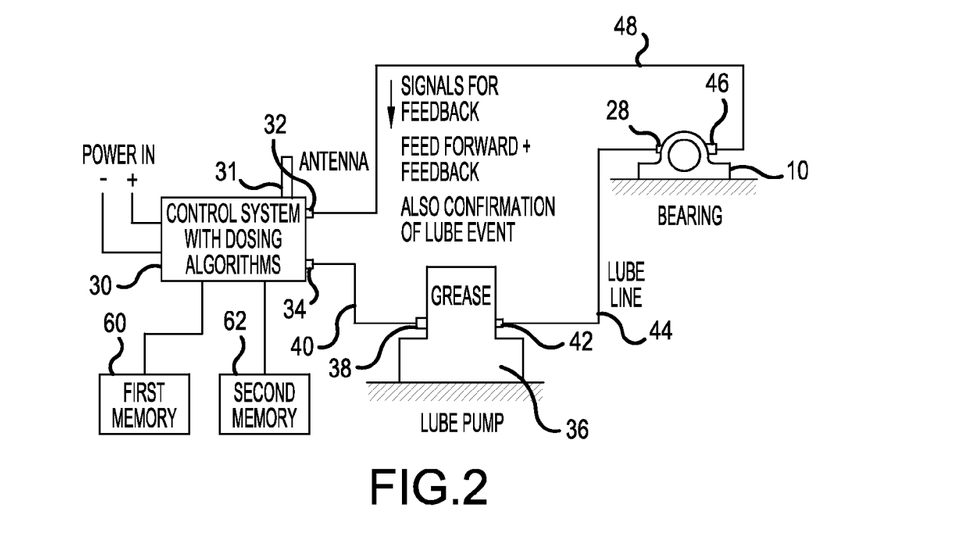
FIG. 2 is a schematic diagram of a first embodiment of a lubrication system according to the present disclosure including the bearing housing of FIG. 1.

FIG. 2 schematically illustrates the bearing housing 10 of FIG. 1 in a lubrication system according to an embodiment of the present disclosure. The lubrication system includes a controller 30 having at least one signal input 32 and at least one signal output 34, a lubrication pump 36 and the bearing housing 10 described above in connection with FIG. 1. The lubrication pump 36 includes a signal input 38 connected to the at least one signal output 34 of the controller 30 by a lubrication signal output line 40 and a grease outlet 42 connected to the lubrication inlet 28 on the bearing housing 10 by a lubrication line 44.

A sensor 46 is mounted on the bearing housing 10 and configured to sense one or more conditions associated with the bearing housing 10 and/or the grease in the free volume 26 of the bearing housing 10, which conditions may include a temperature of the grease or a pressure in the bearing housing 10. To this end, the sensor 46 includes one or more probes (not illustrated)) that extend into the grease in the free volume 26 in the bearing housing 10. The sensor 46 produces, periodically or intermittently, one or more output signals on the sensor output line 48 which sensor output line 48 is connected to the signal input 32 of the controller 30, and the one or more output signals are indicative of the temperature of the grease, the pressure in the bearing housing 10 or both. The signals may be sent at any desired interval, every 15 seconds, for example, and may comprise digital or analog signals or any combination of signals from which the controller 30 can extract information regarding the conditions sensed by the sensor 46.

A wired configuration of the controller 30, lubrication pump 36 and sensor 46 is illustrated FIG. 2. However, one or more of the controller 30, the lubrication pump 36 and the sensor 46 may communicate wirelessly with one another without exceeding the scope of this disclosure. To this end, the controller 30 is shown as having an antenna 31, and the lubrication pump 36 and the sensor 46 can be provided with suitable transmitters and/or receivers and configured to communicate wirelessly with the controller 30 via any of various known wireless communication protocols. It should be understood that any wired connection discussed herein could be replaced with a wireless connection within the scope of the present disclosure.

The controller 30 may comprise a programmable general purpose computer running software configured to receive signal inputs from the sensor 46 and to produce output signals for controlling the lubrication pump 36. The output signals may comprise a single instruction to cause the lubrication pump 36 to cycle and output a fixed volume or dose of grease, or, alternately, the signal produced by the controller 30 may include information for setting the volume of grease to be dispensed in a given dose by the lubrication pump 36 if the lubrication pump 36 is configured to receive and act on such information. As discussed in greater detail below, the controller 30 includes a first memory 60 for storing information about the operating state and lubrication requirements of the bearing assembly 12 and a second memory 62 (which may comprise a location in the first memory 60) for storing rules or algorithms for producing suitable output signals based on the input signals received from the sensor 46.

Figure 3:
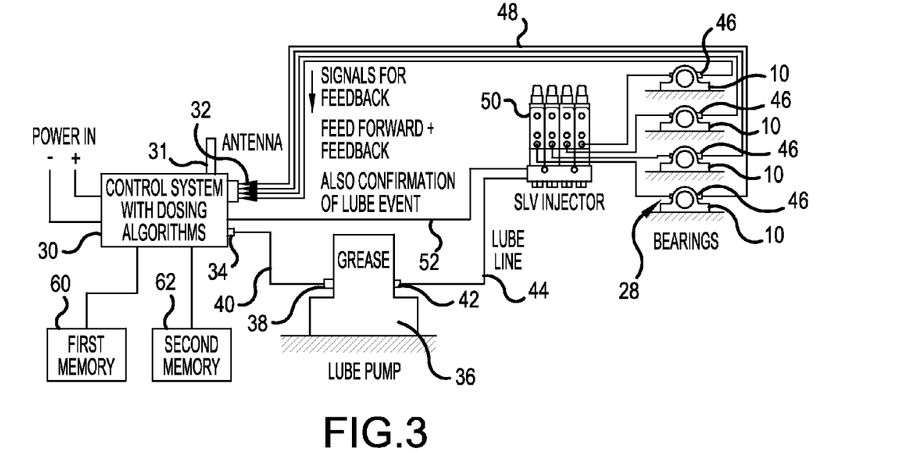
FIG. 3 is a schematic diagram of a second embodiment of a lubrication system according to the present disclosure including multiple bearing housings of FIG. 1.
Figure 4:
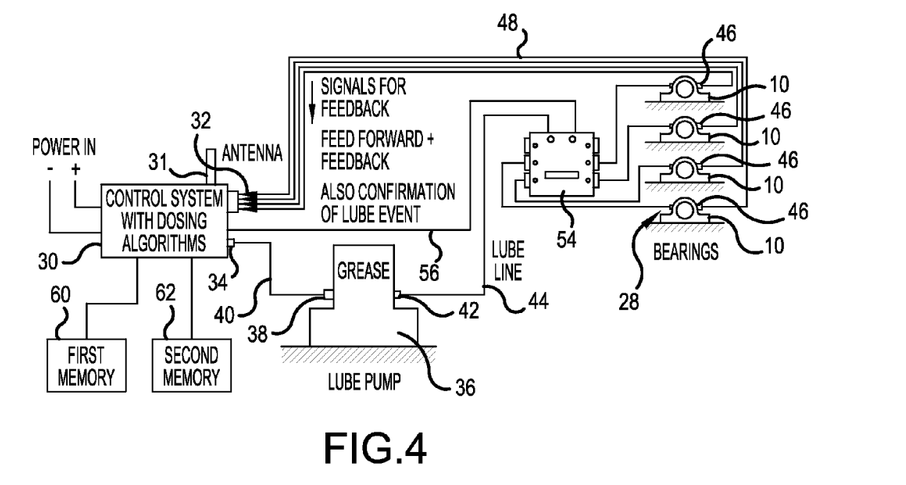
FIG. 4 is a schematic diagram of a third embodiment of a lubrication system according to the present disclosure including multiple bearing housings of FIG. 1.

FIGS. 3 and 4 illustrate two further embodiments of lubrication systems in which the same reference numerals are used to identify elements common to the first embodiment. These embodiments are generally similar to the embodiment of FIG. 2 except that the controller 30 controls the lubrication of multiple bearings housed in multiple bearing housings 10'. FIG. 3 includes an SLV injector 50 which divides and distributes a quantity of grease provided by the lubrication pump 36 to multiple bearing housings 10'—four bearing housings 10' in this example. In order to work effectively with the SLV injector 50, each of the lubrication inlets 28 of the multiple bearing housings 10' includes a valve (not illustrated). The controller 30 may control the lubrication pump 36 as discussed above, and, alternately or in addition, may communicate with the SLV injector 50 via injector communication line 52. When an SLV injector 50 is used that can be adjusted to provide different lubrication amounts to different ones of the bearing housings 10', this control information can be provided by the controller 30.

FIG. 4 illustrates a lubrication system that includes a multi-point lubricator 54. The multipoint lubricator 54 provides greater control over the amount of grease provided to various ones of the multiple bearing housings 10'. The bearing housings 10' are identical to the bearing housings 10' of FIG. 3, and each lubrication inlet 28 in this embodiment also includes a valve (not illustrated). The controller 30 may communicate solely with the lubrication pump 36 as in the first embodiment or may, alternately or in addition, communicate with the multipoint lubricator 54 via multipoint communication line 56 to adjust the dose volume and/or lubrication interval for each of the bearing housings 10'.

Conventional lubrication systems generally dispense grease based on the requirements of the mechanical device being lubricated, for example, a bearing assembly like bearing assembly 12. Conventional bearings may include sensors for measuring vibrations indicative of an under-lubricated bearing condition, and lubricant may be added to the conventional bearing housing when this under-lubrication condition is sensed. Other systems may dispense lubricant on a periodic basis, which period is calculated to ensure that the bearing does not become under-lubricated. However, in conventional bearing housings, when too much lubricant is used, it will be expelled through a pressure relief valve. It is therefore generally desirable to use no more lubricant than the amount required to keep the bearing lubricated because additional lubricant pumped into the housing will be expelled through a pressure relief valve and wasted.

The present disclosure is directed to a method and apparatus for controlling the pressure in the bearing housing 10 to ensure that enough lubricant is expelled from between the inner seal 22 and the shaft 20 and from between the outer seal 24 and the shaft 20 to maintain a film of lubricant between the shaft 20 and the inner and outer seals 22, 24. This may be accomplished by controlling the volume of lubricant added and/or by controlling the rate at which lubricant is added. That is, a sufficient volume of lubricant must be added to the bearing housing 10 to cause some of the lubricant to escape between the shaft 20 and the inner and outer seals 22, 24, and the lubricant must be added sufficiently often that the shaft/seal interface does not dry out between lubricant releases. Because the bearing housing 10 does not have a purge or pressure relief valve, the amount of grease that escapes between the inner and outer seals 22, 24 and the shaft 20 is affected by the pressure in the bearing housing 10.

Beneficially, the inner seal 22 and the outer seal 24 may be balanced, that is, constructed such that substantially the same amount of grease leaks from between each of the seals 22, 24 and the shaft 20 at a given pressure. This helps ensure that a film of lubricant is continuously maintained between both seals and the shaft 20 and that one of the inner and outer seals 22, 24 does not dry out before additional lubricant is released. Alternately, the seals can be configured to allow the release of lubricant preferentially to one side, e.g., the side that is most vulnerable to the ingress of contamination. Or, if one seal comprises a lip seal and the other seal comprises a labyrinth seal as discussed in greater detail below, the labyrinth seal (which is a non-contacting seal) can be configured so that substantially all grease purges from between the lip seal and the shaft. This may be done because the lip seal is the seal that primarily benefits from the movement of grease past the seal. Grease in the labyrinth seal may help prevent the ingress of contaminants through the labyrinth seal, but such a seal does not require grease to reduce friction because the two portions of the labyrinth seal are not in contact.

The pressure in the bearing housing may be controlled by the lubrication pump 36 and by the force with which the inner and outer seals 22, 24 engage the shaft 20. It will be assumed that the lubrication pump 36 can be configured to provide grease at an arbitrarily high pressure, high enough to expel grease from any exclusion seals under consideration herein. Alternately, a plunger or other structure (not illustrated), could be controlled to periodically enter the free volume 26 to increase the pressure in the bearing housing 10 by decreasing the free volume 26. Changing the pressure and/or volume of grease in the free volume 26 is one factor controlling how much grease escapes from the shaft/seal interface Another factor that affects how much grease escapes at a given pressure is the design of the inner and outer seals 22, 24.

Multiple factors affect how tightly a seal engages a shaft. These factors include the material from which the seal is constructed and its flexibility, and well and the length, thickness, number and configuration of various lips or seal portions that make contact with the shaft and how close the seal is mounted to the shaft. Persons of ordinary skill in the art understand how to modify these variables to produce seals that engage shafts with a desired force. For purposes of this disclosure, the force with which a seal engages a shaft will be described in terms of the pressure of grease that can be maintained in the bearing housing by the seal rather than a direct indication of the force exerted by a seal against a shaft. Thus, instead of stating that a seal engages a shaft with "x pounds of force per linear inch," for example, the seal would be described by the pressure at which lubricant will begin to leak from between the shaft and the seal. In conventional newly installed exclusion seals, this pressure must be lower than the pressure at which a pressure relief valve opens. In the present disclosure, for systems without pressure relief valves, the pressure will be set to a higher level than in conventional systems—to 10 psi or 20 psi, for example or even higher.

Another factor that must be considered when selecting an exclusion seal for an application is the amount of friction created by the exclusion seal sliding on a rotating shaft. Making the seal press hard on the shaft increases its ability to exclude foreign contaminants, but at the same time, disadvantageously, increases friction and thus the amount of energy required to rotate the shaft. However, by ensuring that a lubricating film of grease is always present between the seal and the shaft, the present disclosure allows a seal to maintain a greater contact pressure against the shaft without unduly increasing friction.

For example, an exclusion seal set to withstand 20 psi of pressure in a conventional bearing housing could make a shaft difficult to turn. It would also substantially prevent any grease from leaking from a conventional bearing housing because the conventional pressure relief valves would open at approximately 5 psi. However, in the present disclosure, grease is provided to the bearing housing 10 at a sufficient rate to ensure that a quantity of the grease sufficient to lubricate the shaft/seal interface leaks from between the shaft 20 and the inner and outer seals 22, 24. Such seals therefore provide improved resistance against the ingress of foreign contaminants, and the repeated expulsion of grease from between the seals 22, 24 and the shaft 20 forces contaminants that accumulate near the shaft/seal interface away from the seal. Beneficially, a shaft on which such seals are mounted may require generally the same amount of energy to turn as a shaft using a conventional unlubricated exclusion seal while at the same time providing a greater ability to exclude foreign material from the bearing housing 10.

In addition, the seal of the present disclosure will retain its sealing ability down to a pressure of approximately 2 psi, the same as conventional seals. Unlike conventional seals, the seals of the present disclosure will last longer than conventional seals, first, because they have further to wear—from being able to retain 20 psi down to being able to retain 2 psi, for example, unlike conventional seals that may when new be able to retain about 4 psi to and also require replacement when they can only retain about 2 psi, for example, and also because the presence of the lubricating film between the shaft 20 and the inner and outer seals 22, 24 reduces friction thus a rate of wear.

Figure 5:
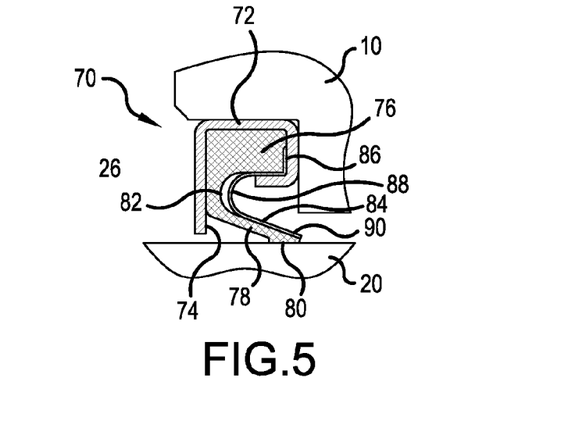
FIG. 5 is a sectional side elevational view of a first seal suitable for use in the present disclosure.

Various exclusion seal configurations can be used with the presently disclosed system. A first seal 70 is illustrated in FIG. 5 inserted between a portion of a bearing housing 10 and a shaft 20. The free volume 26 is located on the left side of the seal 70 in FIG. 5. The seal 70 comprises a circumferential metal case 72 having a radially outwardly facing channel 74 in which is mounted a seal body 76 and a seal lip 78 extending at an angle to the radial direction and terminating at a seal contact surface 80. The seal lip 78 is connected to the seal body 76 at a seal hinge 82, and the material from which the hinge 82 and the seal lip 78 are formed may be resilient so that the seal hinge 82 presses the contact surface 80 against the shaft 20 with a certain force when the contact surface 80 is pressed radially against the shaft 20 by the bearing housing 10. To adjust, in this case, increase the contact force between the contact surface 80 and the shaft 20, a metal spring 84 is provided. The metal spring 84 has a first end 86 mounted between the seal body 76 and the metal case 72, a flexed center portion 88 generally following the curve of the seal hinge 82, and a second end 90 overlying the seal lip 78 and pressing the seal lip 78, and in particular the contact surface 80 at the end of the seal lip 78, against the shaft 20.

The thickness and composition of the seal hinge 82 and the seal lip 78 and the spring force provided by the metal spring 82 affect how tightly the contact surface 80 presses against the shaft 20 and thus the pressure in the free volume 26 that can be maintained by the seal 70. As will be appreciated from this drawing figure, when the pressure in the free volume 26 is greater than the pressure that can be retained by the seal 70, the contact surface 80 separates slightly from the shaft 20, and grease from the free volume 26 escapes from the free volume 26 between the contact surface 80 and the shaft 20. The seal 70 thus has two operating configurations: a sealed configuration that retains grease in the bearing housing 10 and a release configuration that allows grease to escape. The seal 70 can shift repeatedly and non-destructively between these configurations. Allowing a sufficient volume of grease to escape and to escape at a sufficient frequency ensures that a film of lubricant is continuously present between the contact surface 80 of the seal 70 and the shaft 20 to keep friction at the interface of the contact surface 80 and the shaft 20 at an acceptably low level.

Figure 6:
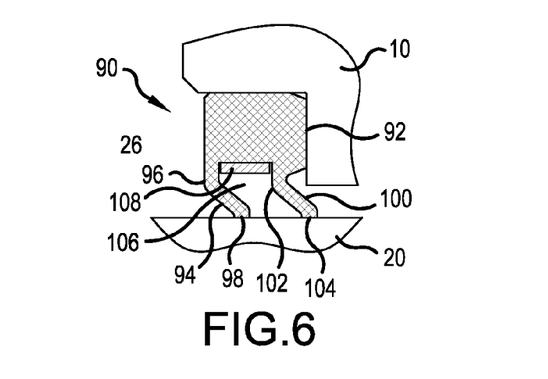
FIG. 6 is a sectional side elevational view of a second seal suitable for use in the present disclosure.

A second seal 90 suitable for use with the presently disclosed system is illustrated in FIG. 6. The seal 90 includes a seal body 92 from which project a first or inner seal lip 94 that is connected to the seal body 92 by a first seal hinge 96 and which terminates in a first contact surface 98 on the shaft 20 and a second or outer seal lip 100 that is connected to the seal body 92 by a second seal hinge 102 and which terminates in a second contact surface 104 on the shaft 20. The outer seal lip 100 is separated from the inner seal lip 94 by an interlip space 106. A stiffening band 108 is mounted on a radially inner side of the seal body 92 between the inner seal lip 94 and the outer seal lip 100 to increase the stiffness of the seal 90.

The seal 90 is pressed against the shaft 20 by the bearing housing 10, and the pressure maintainable in the free volume 26 of the bearing housing is determined by the material and configuration of the first and second seal lips 94, 100. This double lip construction provides benefits in the present system when used in highly contaminated environments because the first and second lips 94, 100 provide additional protection against the ingress of contaminants. Grease exiting the free volume 26 must pass between the first contact surface 98 and the shaft 20, enter and/or circulate in the interlip space 106 and then pass between the second contact surface 104 and the shaft 20 before exiting the bearing housing 10. Even if contaminants manage to penetrate the outer seal lip 100 of the seal 90, they may thereafter become trapped in the interlip space 106 and eventually be expelled by additional grease passing through the interlip space 106 on its way out of the bearing housing 10. Contaminants thus must travel past two seal lips and find their way out of the interlip space 106 while moving upstream against an exiting flow of grease in order to reach the interior of the bearing housing 10 and potentially cause damage.

While such double lip seals provide good protection, they may be unsuitable for some conventional applications. In a conventional system, one without a constant film of lubricant between the shaft 20 and the seal 90, the friction produced by two lips might be too high and cause excessive drag on the shaft 20 and cause the seal to wear so quickly that frequent replacement would be required. However, by continuously maintaining a lubricating film between the first contact surface 98 and the shaft 20 and between the second contact surface 104 and the shaft 20, the exclusion benefits provided by this double lip construction can be obtained without creating excessive drag.

Figure 7:
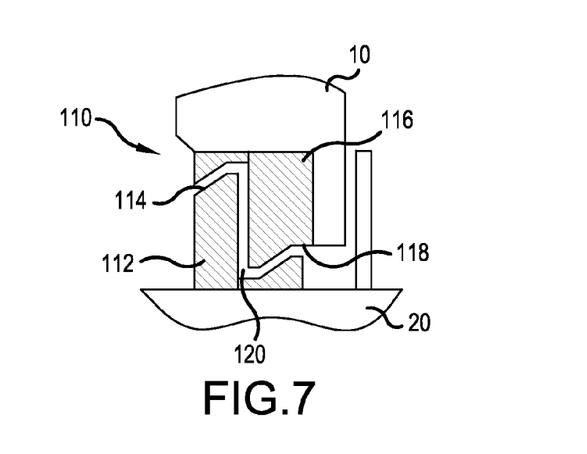
FIG. 7 is a sectional side elevational view of a third seal suitable for use in the present disclosure.

A third seal 110 useable with some embodiments of the present disclosure is illustrated in FIG. 7. The seal 110 comprises a labyrinth seal with a shaft-mounted element 112 having an outer surface 114 and a housing-mounted element 116 having an outer surface 118. The outer surface 114 of the shaft-mounted element 112 is complementary to the outer surface 118 of the housing-mounted element and faces the outer surface 118 of the housing-mounted element. The outer surfaces 114, 118 are not linear and include at least one change of direction along a direction of the shaft axis such that grease in the free volume 26 must follow a tortuous path 120 from the free volume 26 to the outside of the housing. The radial separation of the shaft-mounted element 112 and the housing-mounted element 116, together with the number of bends and direction changes along the tortuous path 120 affect the pressure in the free volume 26 required to drive grease through the tortuous path and out of the bearing housing 10. The seal 110 can thus be configured to prevent the release of grease at pressures below a first level and to allow the release of grease through the tortuous path 120 at pressures above the first level. When two labyrinth seals are used together, on inner and outer sides of a housing, for example, the seals can be configured to allow the release of grease preferentially through one of the two seals or configured so that substantially equal amounts of grease are released through both seals.

To lubricate a contact seal, such as the first seal 70 and the second seal 90 discussed above, the controller 30 may be configured to cause the lubrication pump 36 to add a given quantity of grease to the bearing housing 10 each hour. The amount of grease added may be based on various factors. For example, to ensure that the lubricating film is maintained, the controller 30 may be configured to cause the lubrication pump 36 to dispense a given volume of grease in smaller doses than normal. If a given bearing requires 5 cc of grease per hour to be adequately lubricated, the controller 30 may dispense at least one cc of grease every 12 minutes to ensure that the first and second seals 22, 24 are lubricated. It may be preferable to dispense a greater volume of grease per hour than is conventionally required when only the lubrication requirements of the bearing are considered. Therefore, in the foregoing example, the controller 30 may be configured to cause the lubrication pump to dispense 1.5 or 2.0 cc of grease every 12 minutes. In general, the interval between dispensing doses of grease will be shortened and enough grease will be added to the free volume 26 to ensure that some portion of the grease escapes from the bearing housing 10 with each dose.

In some applications, it may be possible to use the signal provided by the sensor 46 to control the dispensing of grease. That is, the pressure in the bearing housing 10 may be measured to obtain an average pressure and then the controller 30 may be actuated to dispense a sufficient quantity of grease into the bearing housing 10 to raise the pressure by a predetermined amount, 2 psi, for example. The average pressure will represent the pressure that the inner and outer seals 22, 24 are capable of retaining a give state of wear, and increasing the pressure ensures that this pressure is exceeded so that grease will leak from between the shaft 20 and the inner and outer seals 22, 24, and lubricate the shaft/seal interface. However, in other applications, the movement of the bearing assembly 12 or other system being lubricated may cause pressure fluctuations that make it difficult or impossible to accurately measure pressure or to add grease based on instantaneously measured pressure levels in the bearing housing. In those cases, grease can be added a time basis, which time basis can be determined empirically, if necessary, by determining how long it takes for a given grease at a given shaft/seal interface at a give temperature to wear away. The controller 30 can thus be configured to cause grease to be dispensed sufficiently frequently to maintain the lubricating film.

The signal provided by the pressure sensor also allows the controller 30 to perform a seal test and determine when the inner and outer seals 22, 24 have worn to the point that they require replacement. A seal test is performed when the bearing assembly 12 in the bearing housing 10 is not operating. To perform a seal test, the controller 30 causes the lubrication pump 36 to pump lubricant into the bearing housing 10 as rapidly as practicable in order to raise the pressure in the bearing housing 10 while monitoring the pressure level in the bearing housing 10. If the pressure cannot be raised to above a predetermined pressure, 2 psi for example, the controller 30 determines that the inner and outer seals 22, 24 are no longer providing adequate protection against the ingress of foreign matter, and the controller 30 generates an output signal that indicates that the inner and outer seals 22, 24 need to be replaced.

The seal test can produce a binary output—that is, the seal either passes or fails the seal test. Optionally, the controller 30 may provide an indication of the state of wear of the inner and outer seals 22, 24 by producing different output signals based on the maximum pressure that is obtainable during the pressure test. For example, assume that a particular seal or set of seals can maintain a pressure in the bearing housing of 20 psi when new and that such seals require replacement when they can no longer maintain a 2 psi pressure in a bearing housing. The controller 30 may be configured to output signal indicating that the seal is "nearly new" when the seal is capable of maintaining a pressure of greater than 10 psi, a signal indicating that the seal is "somewhat worn"

when the maximum pressure obtainable is between 5 psi and 10 psi, and a signal indicating that the seal will soon require replacement when the maximum pressure obtainable is between 2 psi and 5 psi. Alternately or in addition, the controller 30 can provide an indication of the actual maximum pressure that was obtained during the test. In this manner, during a monthly maintenance of the system, for example, maintenance personnel can determine whether seal replacement is required and know when replacement imminent.

The controller 30 may also beneficially use the temperature signal output from the sensor 46 to confirm that lubricant has been added to the bearing housing 10. Each dose of lubricant added to the bearing housing 10 will increase the pressure in the bearing housing 10 before grease escapes. Because temperature is proportional to pressure in a fixed volume system, the periodic pressure increases caused by the addition of lubricant can be detected by detecting transient temperature increases in the grease. This method may only be effective when the added dose of lubricant is sufficiently large to change the temperature by an unambiguously measurable amount. However, it is believed that the addition of, for example, 5 cc doses of lubricant may be sufficient to briefly raise the temperature of the lubricant in a manner that allows a lubrication event to be confirmed. The controller 30 may be configured to monitor these temperature increases and ensure that a temperature increase follows each addition of lubricant. If a temperature increase is not detected, the controller 30 may provide an indication of a leak or blockage in the lubrication line or another problem with the system that requires attention.

Figure 8:
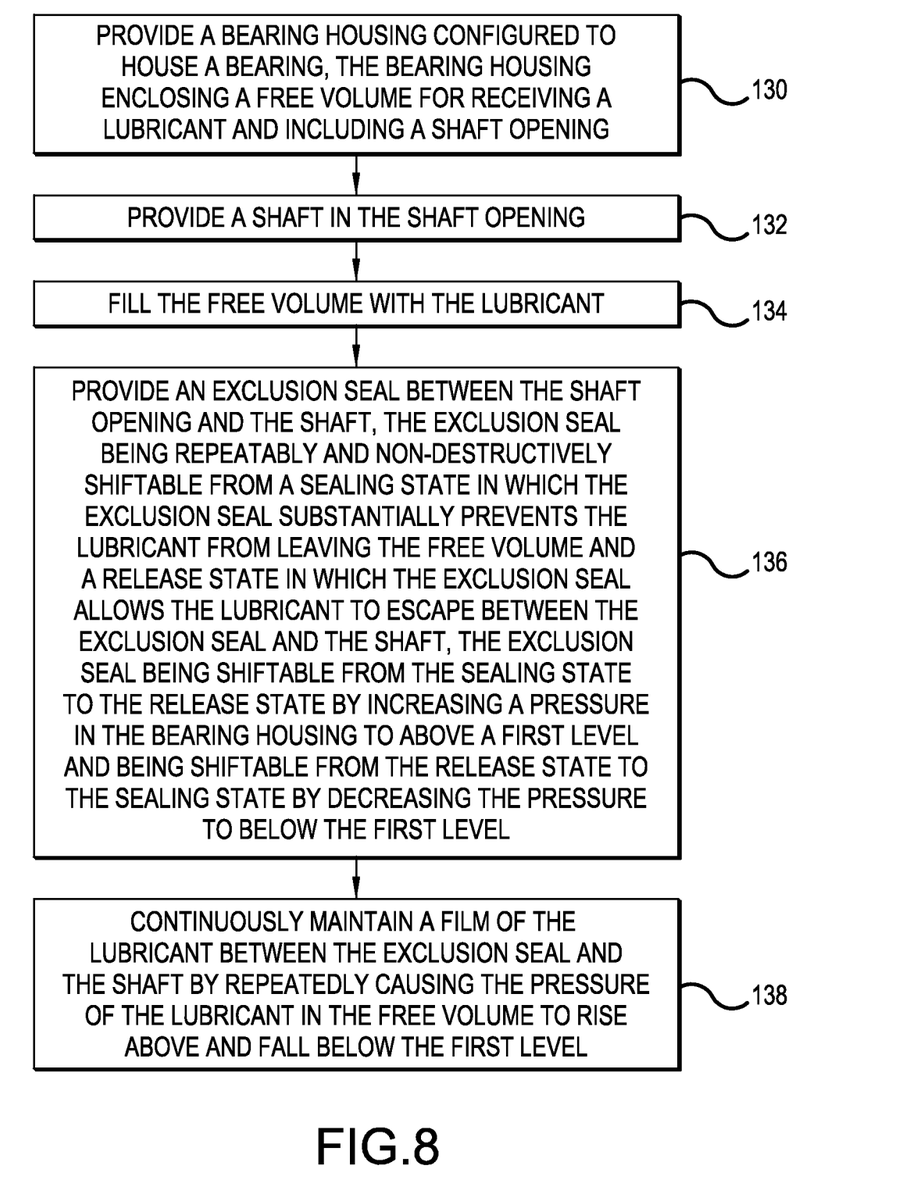
FIG. 8 is a flow chart illustrating a first method according to the present disclosure.

A method according to the present disclosure is illustrated in FIG. 8. This method includes a step 130 of providing a bearing housing configured to house a bearing, the bearing housing enclosing a free volume for receiving a lubricant and including a shaft opening, a step 132 of providing a shaft in the shaft opening, a step 134 of filling the free volume with the lubricant, a step 136 of providing an exclusion seal between the shaft opening and the shaft, the exclusion seal being repeatably and non-destructively shiftable from a sealing state in which the exclusion seal substantially prevents the lubricant from leaving the free volume and a release state in which the exclusion seal allows the lubricant to escape between the exclusion seal and the shaft, the exclusion seal being shiftable from the sealing state to the release state by increasing a pressure in the bearing housing to above a first level and being shiftable from the release state to the sealing state by decreasing the pressure to below the first level, and a step 138 of continuously maintaining a film of the lubricant between the exclusion seal and the shaft by repeatedly causing the pressure of the lubricant in the free volume to rise above and fall below the first level.

Figure 9:
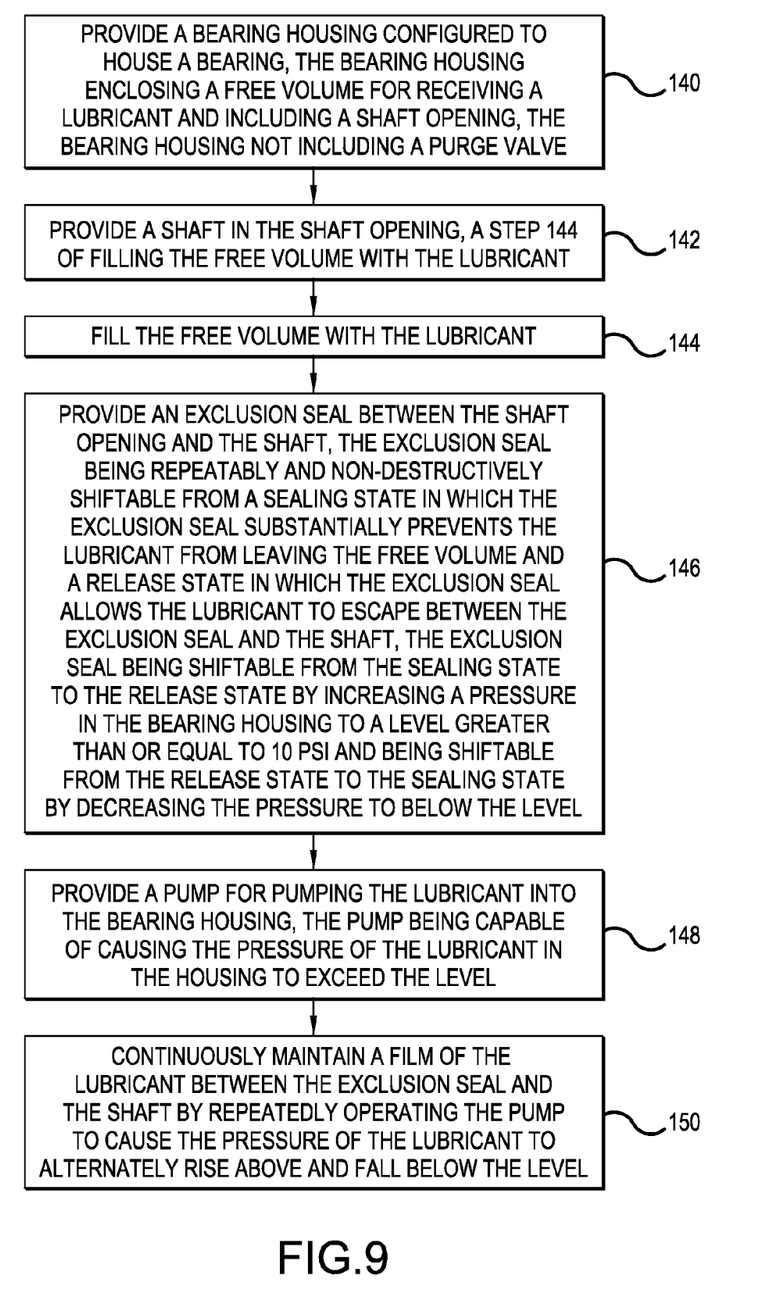
FIG. 9 is a flow chart illustrating a second method according to the present disclosure.

Another method according to the present disclosure is illustrated in FIG. 9 and includes a step 140 of providing a bearing housing configured to house a bearing, the bearing housing enclosing a free volume for receiving a lubricant and including a shaft opening, the bearing housing not including a purge valve, a step 142 of providing a shaft in the shaft opening, a step 144 of filling the free volume with the lubricant, a step 146 of providing an exclusion seal between the shaft opening and the shaft, the exclusion seal being repeatably and non-destructively shiftable from a sealing state in which the exclusion seal substantially prevents the lubricant from leaving the free volume and a release state in which the exclusion seal allows the lubricant to escape between the exclusion seal and the shaft, the exclusion seal being shiftable from the sealing state to the release state by increasing a pressure in the bearing housing to a level greater than or equal to 10 psi and being shiftable from the release state to the sealing state by decreasing the pressure to below the level, a step 148 of providing a pump for pumping the lubricant into the bearing housing, the pump being capable of causing the pressure of the lubricant in the housing to exceed the level, and a step 150 of continuously maintaining a film of the lubricant between the exclusion seal and the shaft by repeatedly operating the pump to cause the pressure of the lubricant to alternately rise above and fall below the level.

Figure 10:
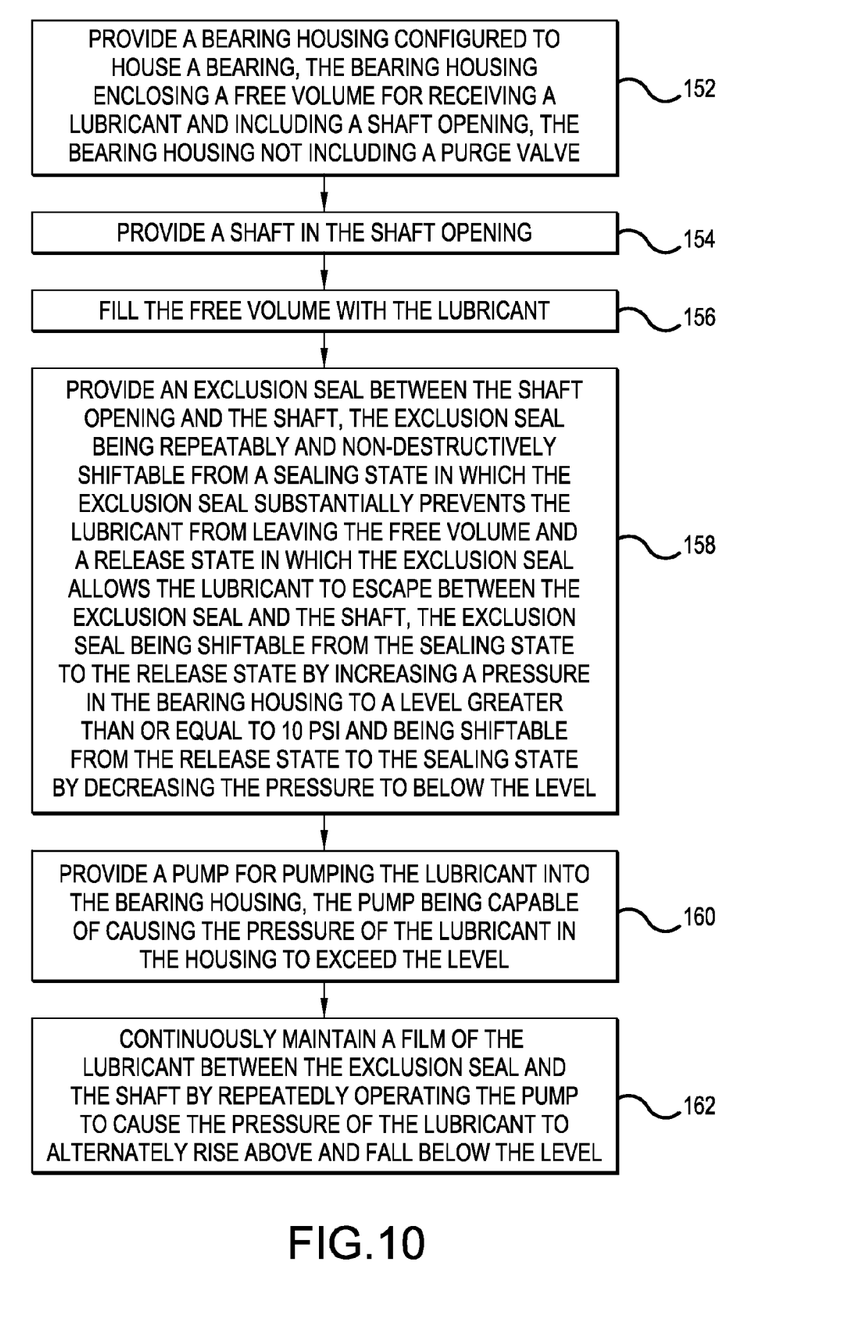
FIG. 10 is a flow chart illustrating a third method according to the present disclosure.

Another method according to the present disclosure is illustrated in FIG. 10 and comprises a step 152 of providing a bearing housing configured to house a bearing, the bearing housing enclosing a free volume for receiving a lubricant and including a shaft opening, the bearing housing not including a purge valve, a step 154 of providing a shaft in the shaft opening, a step 156 of filling the free volume with the lubricant, a step 158 of providing an exclusion seal between the shaft opening and the shaft, the exclusion seal being repeatably and non-destructively shiftable from a sealing state in which the exclusion seal substantially prevents the lubricant from leaving the free volume and a release state in which the exclusion seal allows the lubricant to escape between the exclusion seal and the shaft, the exclusion seal being shiftable from the sealing state to the release state by increasing a pressure in the bearing housing to a level greater than or equal to 10 psi and being shiftable from the release state to the sealing state by decreasing the pressure to below the level, a step 160 of providing a pump for pumping the lubricant into the bearing housing, the pump being capable of causing the pressure of the lubricant in the housing to exceed the level, and a step 162 of continuously maintaining a film of the lubricant between the exclusion seal and the shaft by repeatedly operating the pump to cause the pressure of the lubricant to alternately rise above and fall below the level.

The present invention has been discussed herein in terms of presently preferred embodiments. Additions and modifications to these embodiments will become apparent to persons of ordinary skill in the art upon a reading of the foregoing disclosure. It is intended that all such additions and modifications form a part of the present invention to the extent they fall within the scope of the several claims appended hereto.

What is claimed is:

1. A bearing system comprising:
   a bearing housing configured to house a bearing, the bearing housing enclosing a free volume for receiving a lubricant and including a shaft opening;
   a bearing in the bearing housing;
   a pump configured to pump lubricant into the free volume;
   a shaft in the shaft opening and rotatably supported by the bearing;
   an exclusion seal between the shaft opening and the shaft, the exclusion seal being repeatably and non-destructively shiftable from a sealing state in which the exclusion seal substantially prevents lubricant from leaving the free volume and a release state in which the exclusion seal allows lubricant to escape between the exclusion seal and the shaft, the exclusion seal being shiftable from the sealing state to the release state by increasing a pressure in the bearing housing to above a first level and being shiftable from the release state to the sealing state by decreasing the pressure to below the first level; and a controller configured to repeatedly shift the exclusion seal between the sealing state and the release state by raising and lowering the pressure in the free volume to continuously maintain a lubricating film of the lubricant between the exclusion seal and the shaft.

2. The bearing system of claim 1, wherein the controller is configured to raise the pressure by causing the pump to pump the lubricant into the free volume.

3. The bearing system of claim 2, wherein the only location for the lubricant to exit the bearing housing is between the shaft and the exclusion seal.

4. The bearing system of claim 3, wherein the first level is greater than or equal to 10 psi.

5. The bearing system of claim 3, wherein the first level is greater than or equal to 20 psi.

6. The bearing system of claim 1, including a pressure sensor configured to measure a pressure of the lubricant in the bearing housing and to send a signal indicative of the measured pressure to the controller,
wherein the controller is operable in a seal test mode, the controller in the seal test mode being configured to cause the pump to pump the lubricant into the bearing housing substantially continuously to raise the pressure in the bearing housing and to determine the maximum pressure obtainable by pumping the lubricant into the bearing housing substantially continuously and to produce an output signal indicative of a worn seal if the maximum pressure obtainable is less than a predetermined pressure.

7. The bearing system of claim 1, including a temperature sensor configured to measure a temperature of the lubricant in the bearing housing and send a temperature signal indicative of the measured temperature to the controller and wherein the controller is configured to cause the pump to repeatedly add the lubricant to the bearing housing and to determine whether a temperature increase occurs in response to the addition of the lubricant to the bearing housing.

8. The bearing system of claim 7, wherein the controller is configured to produce a signal indicative of a failed lubrication event when the controller determines that a temperature increase does not occur in response to the addition of the lubricant to the bearing housing.

9. A bearing system comprising:
a bearing housing configured to house a bearing, the bearing housing enclosing a free volume for receiving a lubricant and including a shaft opening;
a shaft in the shaft opening; and
an one exclusion seal between the shaft opening and the shaft, the exclusion seal being repeatably and non-destructively shiftable from a sealing state in which the exclusion seal substantially prevents lubricant from leaving the free volume and a release state in which the exclusion seal allows the lubricant to escape between the exclusion seal and the shaft, the exclusion seal being shiftable from the sealing state to the release state by increasing a pressure in the bearing housing to above a first level and being shiftable from the release state to the sealing state by decreasing the pressure to below the first level,
wherein the only location for the lubricant to exit the bearing housing is between the shaft and the exclusion seal.

10. The bearing system of claim 9, wherein the first level is greater than or equal to 10 psi.

11. The bearing system of claim 9, wherein the first level is greater than or equal to 20 psi.

12. The bearing system of claim 9, including a pump for pumping the lubricant into the bearing housing, the pump being capable of causing the pressure of the lubricant to exceed the first level.

13. The bearing system of claim 12 including:
a controller operably connected to the pump, wherein the controller is configured to cause the pump to add the lubricant to the free volume to increase the pressure to above the first level sufficiently often to continuously maintain a film of the lubricant between the exclusion seal and the shaft.

14. The bearing system of claim 13, including a pressure sensor configured to measure a pressure of the lubricant in the bearing housing and to send a signal indicative of the measured pressure to the controller,
wherein the controller is operable in a seal test mode, the controller in the seal test mode being configured to cause the pump to pump the lubricant into the bearing housing substantially continuously to raise the pressure in the bearing housing and to determine the maximum pressure obtainable by pumping the lubricant into the bearing housing substantially continuously and to produce an output signal indicative of a worn seal if the maximum pressure obtainable is less than a predetermined level.

15. The bearing system of claim 9, including a temperature sensor configured to measure a temperature of the lubricant in the bearing housing and send a temperature signal indicative of the measured temperature to the controller and wherein the controller is configured to cause the pump to repeatedly add the lubricant to the bearing housing and to determine whether a temperature increase occurs in response to the addition of the lubricant to the bearing housing.

16. The bearing system of claim 9, including a second exclusion seal, the second exclusion seal being configured to repeatably and non-destructively shift from a sealing state in which the second exclusion seal substantially prevents lubricant from leaving the free volume and a release state in which the second exclusion seal allows the lubricant to escape between the second exclusion seal and the shaft, the second exclusion seal being shiftable from the sealing state to the release state by increasing a pressure in the bearing housing to above a second level and being shiftable from the release state to the sealing state by decreasing the pressure to below the second level, wherein the second level is greater than said first level.

17. The bearing system of claim 9, including a second exclusion seal, the second exclusion seal being configured to repeatably and non-destructively shift from a sealing state in which the second exclusion seal substantially prevents lubricant from leaving the free volume and a release state in which the second exclusion seal allows the lubricant to escape between the second exclusion seal and the shaft, the second exclusion seal being shiftable from the sealing state to the release state by increasing a pressure in the bearing housing to above the first level and being shiftable from the release state to the sealing state by decreasing the pressure to below the first level.

18. A bearing system comprising:
a bearing housing configured to house a bearing, the bearing housing enclosing a free volume for receiving a lubricant and including a shaft opening;
a pump configured to pump the lubricant into the bearing housing;
a shaft in the shaft opening;

at least one exclusion seal between the shaft opening and the shaft, the at least one exclusion seal being configured to allow the lubricant to escape past the at least one exclusion seal when the pressure is above a first level;

a controller operably connected to the pump for controlling the pump, and a pressure sensor configured to measure a pressure in the bearing housing and to send an output signal to the controller indicative of the measured pressure;

wherein the controller is configured to add the lubricant to the housing and monitor a pressure in the housing while adding the lubricant, to determining a maximum pressure obtainable by adding the lubricant to the housing, and if the maximum pressure is not greater than a predetermined pressure to provide a signal indicative of a worn seal.

19. The bearing system of claim 18, wherein the at least one exclusion seal is configured to shift repeatably and non-destructively from a sealing state for preventing the lubricant from leaving the free volume when the pressure is below the first level and a release state for allowing the lubricant to escape from the free volume when the pressure is above the first level.

20. The bearing system of claim 18, wherein the at least one exclusion seal comprises a labyrinth seal.

* * * * *